June 7, 1960 — F. E. WEEKS — 2,939,331
QUIET GEAR
Filed March 25, 1959
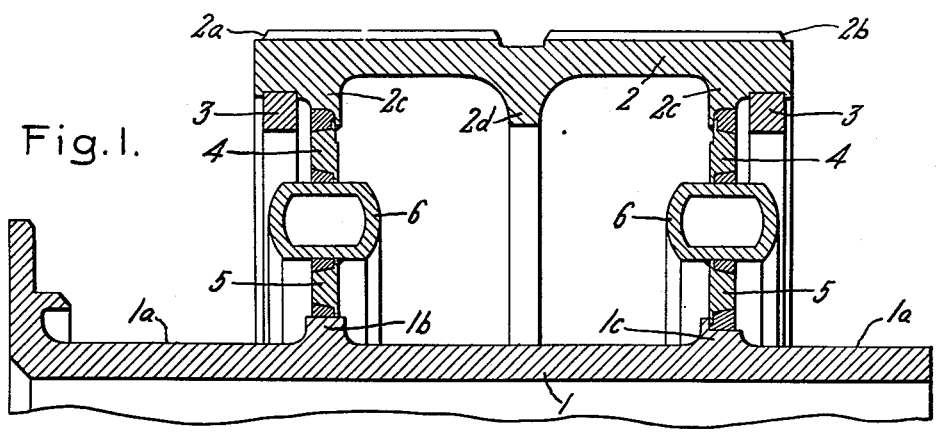
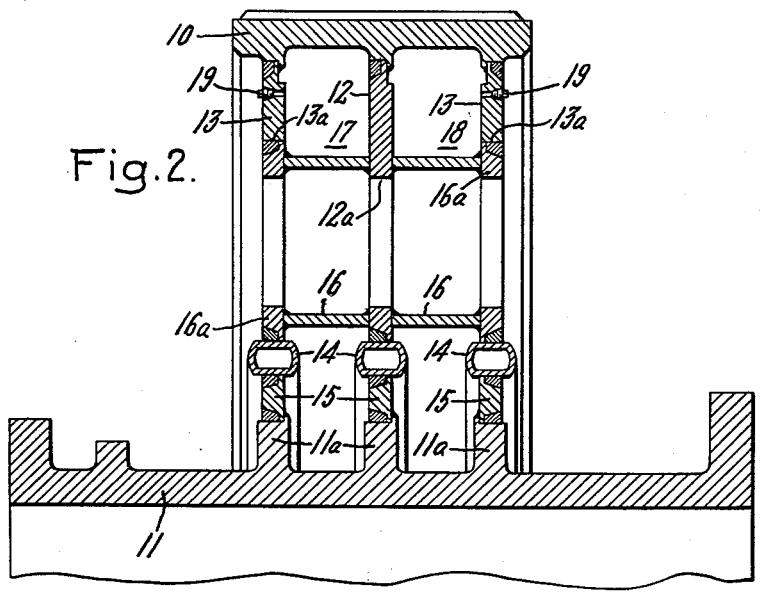
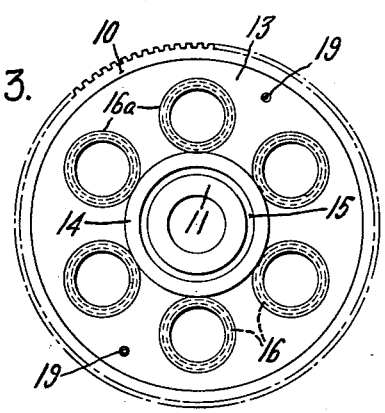
INVENTOR
FRANK E. WEEKS
BY
HIS ATTORNEY United States Patent Office 2,939,331
Patented June 7, 1960

2,939,331
QUIET GEAR

Frank E. Weeks, Boston, Mass., assignor to General Electric Company, a corporation of New York Filed Mar. 25, 1959, Ser. No. 801,949

5 Claims. (Cl. 74—443)

This invention relates to the construction of a quiet gear, and more particularly it relates to an improved fabricated gear for reducing the sound-generating vibrations caused by the meshing gear teeth.

Much consideration has been given in the past to the reduction of the noise and undeisrable vibrations which accompany the meshing of the teeth in a pair of gears. Although the reduction of the noise is desirable for obvious reasons in any piece of machinery employing gears which is intended to operate in the vicinity of human beings, the problem has become particularly acute in designing machinery where noiseless and smooth operation is absolutely essential, for example, in the propulsion transmission gearing of any marine vessel where a premium is placed on silence.

The phenomenon giving rise to these sound-generating vibrations may be summarized briefly as follows. As a pair of meshing gears rotates, the majority of the gear teeth are free from any imposed stress. At the point where the gears engage, however, the driving gear imposes a torque on the driven gear through contact between the mutually extending gear teeth. In addition to the tangential force which generates the torque imposed on the tooth of the driven gear, and depending upon the type of gear tooth employed, radial force components are also produced. These radial components tend to compress the gear rim or "tire" radially toward the hub in one phase of meshing and away from the hub in another phase. As successive gear teeth engage and disengage, it will be apparent that a series of periodic compressive impulses are transmitted radially from the tire of the gear to the gear hub. This energy is transmitted as vibrations from the hub to the shaft, from the shaft to the bearings, and thence to the supporting structure, where it will appear as sound, radiated from the large gear casing surfaces and other mechanically or acoustically connected surfaces.

Accordingly, a object of the present invention is to provide an improved fabricated gear having a low noise level in operation.

Another object is to provide an improved gear for reducing the radiation of sound from a gear unit by reducing the energy of compressive waves travelling from the gear tire to the hub.

A still further object is to provide an improved gear structure for absorbing and dissipating sound-generating vibrations produced by the meshing teeth of a gear set.

Generally stated, the invention is practiced by providing one or more resilient toroidal members radially spaced between the tire and the hub which act to absorb the compressive vibrations instead of permitting them to travel to the hub.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing, in which:

Fig. 1 is a cross-section view taken through a gear employing the invention;

Fig. 2 is a cross-section of a modified form of gear employing the invention;

Fig. 3 is a full side view of the modified gear of Fig. 2.

Referring now to Fig. 1, the gear structure consists of a hub or journal 1 and a radially spaced gear tire 2. The tire 2 is a cylindrically shaped member and is shown here as having two rows of gear teeth 2a, 2b disposed on its outer circumferential surface. The shape and disposition of the gear teeth are not material to an understanding of the present invention, but they may consist either of simple spur gear teeth or preferably, in order to promote smooth and quiet operation, are of the "herringbone" type. The tire 2 is of relatively rigid construction and is formed with internal radially extending flanges 2c shaped to receive a welding bead and a central annular stiffening rib 2d. Oil retaining rings 3 are attached to the tire 2 at opposite ends and will not be referred to further since they form no part of the present invention.

The journal 1, which acts as a combination gear hub and shaft, is provided with finished surfaces 1a which will be supported by appropriate bearings (not shown) and with radial projections 1b, 1c which form a support structure for the fabricated web and tire assembly.

The web of the gear is a composite structure comprised of radially extending outer ring members 4, radially extending inner ring members 5, and hollow toroidal shaped members 6 which act to reflect and dissipate the vibrational energy which would otherwise be transmitted radially inward through the web to the hub. Outer rings 4 are attached to the projections 2c on the tire by a suitable method such as welding and inner rings 5 are similarly attached to the radial projections 1b, 1c on the journal 1. The surfaces of the projections 1b, 1c, 2c are so formed that the welds by which the inner and outer rings are attached to these projections fill the space between the members. This interposition of several annular weld areas further reduces the transmitted energy, since it is found that a wave travelling in a solid body will lose a portion of its energy when being transmitted across a boundary between two different materials. The multiple rings of weld metal, being of a slightly different quality than the parent metal, will significantly aid in this dissipation of energy.

Attached between the inner and outer rings by a suitable method such as welding, is the vibration absorbing and reflecting member 6. As can be seen from the drawing of Fig. 1, member 6 is generally hollow and toroidal in shape and is preferably constructed of a continuous tube of metal having a wall thickness somewhat less than that making up the remainder of the web. The reduced wall thickness acts to give the member more flexibility, relatively speaking, than other portions of the gear structure. A cross-section taken through member 6 illustrates that it is not a circle as would be the case in a true torus, but rather is formed having flattened radially inner and outer surfaces with arcuate sides. This shape increases the "radial resiliency" of member 6 without significantly reducing its transverse rigidity, by giving a larger surface area subject to bending in a radial plane. It also provides a flat surface abutting the web portion, which is desirable to facilitate the welding operation. For purposes of convenience of reference herein, member 6 will be referred to hereafter as a "torus."

Torus 6, as shown here, is preferably formed of seamless tubing bent into a circular shape, and then flattened on the radially inner and outer surfaces, for instance by passing through a forming roll. It will be appreciated that torus 6 will tend to flex when opposing forces are applied to it by inner and outer rings 4 and 5. This is due both to the aforementioned fact that torus 6 has a smaller wall thickness, relatively speaking, than the other members of the gear, and also due to the inherent resiliency provided by the shape of the torus. The compressive impulse acting through the web 4 will "pinch" or squeeze the torus walls toward one another momentarily and then torus 6, due to its resiliency, will spring back to its former shape thus reflecting the compressive force back toward the tire whence it came. Although a small portion of the momentary impulse generated in outer ring 4 will be transmitted radially inward to inner web portion 5, it will be greatly reduced in magnitude and will be dissipated, partly in transmission through the multiple rings of weld metal, so as to blend with subsequent impulses from successive gear teeth travelling through outer ring 4 due to the discontinuity afforded by torus 6.

Since torus 6 also acts as a reflector for the wave energy reaching it through outer ring 4, the reflected wave will act to dampen or cancel and thereby reduce subsequent compressive waves passing through rings 4 by interference since the reflected wave will be travelling in the opposite direction from the primary wave.

A modified form of the invention may be seen by reference to Fig. 2, in which is shown a fabricated gear having a more complicated web assembly. The tire section 10 is secured to the hub 11 by three axially spaced outer disks 12, 13 attached to three axially spaced tori 14 which in turn are connected to projections 11a on the hub 11 by three axially spaced inner ring members 15. In order to provide transverse rigidity and to aid in damping the reflected wave from tori 14, tubular spacer members 16 are used to axially space the disks 13. In order to facilitate assembly, small auxiliary rings 16a are pre-welded to tubular spacers 16 on one end. These spacer tubes 16 are located at corresponding circular holes 12a, 13a which have been cut in disks 12, 13 at equal intervals around the disks and are secured to the disks by a suitable means such as welding. Reference to Fig. 3 will illustrate the location and shape of spacer tubes 16.

The toroidal members 14 in Fig. 2 function in the same manner as the toroidal members 6 of Fig. 1 to absorb the vibrational energy imposed upon them by the tire 10 and the intervening web structure. It will be noted that the fabricated web structure, the tire 10, and the hub 11 define two continuous enclosed cavities 17, 18 which are substantially sealed from the outside. In order to aid in reducing the reflected vibrations, voids 17, 18 may be filled with a suitable sound-deadening material by means of plugged openings 19. A suitable substance for this purpose consists of a foaming plastic which can be introduced through openings 19 and allowed to expand to completely fill cavities 17, 18 with a sound-deadening material which is highly effective due to the large quantity of gas pockets. The use of such an absorbing material will substantially reduce the energy reflected by tori 14 and act to dampen and dissipate this energy.

The operation of my immproved quiet gear will be apparent from the foregoing description. Sound-generating vibrations occasioned by the meshing gear teeth transmit radially directed compressive waves from the tire toward the hub or journal. These compressive waves impinge upon the relatively resilient torus walls which will flex to reflect and dissipate the compressive waves, leaving only a small portion of the compressive waves to travel inward to the shaft and bearings. Due to the flexibility of the torus, a substantial portion of the energy is reflected and will dissipate itself by cancelling out the primary compressive waves or by dissipating itself as heat in the intervening web structure between the torus and the tire. The multiple annular zones of weld metal connecting the web portions to rim, hub, and torus member respectively also have a substantial vibration-impeding effect.

Thus a very simple and effective fabricated gear construction is disclosed which will substantially reduce the noise level occasioned by the meshing gear teeth.

Other modifications will occur to those skilled in the art such as varying the number, shape and location of the vibration absorbers which have been shown in the preferred embodiments of the invention. For instance, the toroidal member could be of circular section, rather than the flattened cross-section shown herein. It is, of course, intended to cover in the appended claims all such modifications and equivalents which fall within the scope of this invention.

What I claim as new and desire to secure by Letters Patent of the United States is:

1. A quiet gear comprising a cylindrical journal having an external radially extending annular flange, a gear tire having gear teeth thereon coaxially spaced from said journal and having an internal radially extending annular flange, vibration absorbing means secured at its radially innermost and outermost surfaces to said journal flange and said tire flange, respectively for transmitting torque therebetween, said vibration absorbing means comprising a hollow toroidal member having flexible walls thinner than the flange members to which it is secured.

2. A quiet gear in accordance with claim 1 in which the vibration absorbing means comprises a flexible-walled hollow toroidal member with its inner and outer surfaces flattened so that the axial width thereof exceeds its radial dimension.

3. A quiet gear comprising rotatably mounted journal means having a radial annular flange disposed thereon, a gear tire having gear teeth thereon coaxially spaced from said journal means and having radially extending flange directed inwardly therefrom, and a vibration reflecting member connecting the tire and the journal for transmitting torque therebetween and comprising a continuous hollow toroidal member having a relatively thin wall and flattened on its radially innermost and outermost surfaces so as to provide resiliency in bending in the radial direction, whereby radially transmitted compressive impulses directed from the tire to the journal will be reflected back to the tire.

4. A quiet gear comprising a journal portion including a plurality of radially extending, axially spaced journal flanges, a coaxially disposed radially spaced tire portion having gear teeth thereon and including a plurality of axially spaced internal circumferential flanges equal in number to said journal flanges, a plurality of inner web rings secured at their innermost peripheries to said journal flanges, a plurality of outer web rings secured at their outermost peripheries to said tire flanges, said inner and outer web rings being radially spaced to define annular openings coaxial with said journal, and a plurality of vibration-absorbing hollow toroidal members disposed in said annular openings and secured to said inner and outer web rings for transmitting torque therebetween, each of said toroidal members being constructed of a continuous hollow tube arranged to flex radially when subjected to radially directed compressive impulses between said inner and outer web rings, whereby vibrations transmitted through said outer rings by the meshing of the teeth on the tire portion are dissipated by said toroidal members.

5. The combination according to claim 4 wherein said toroidal member is an annular tube with inner and outer surface of the annulus flattened so that the axial width thereof exceeds the radial dimension of the torus, and wherein the inner and outer web rings are secured to the tire and journal members and to the torus, respectively, by annular welds which provide a series of radial ly spaced weld rings between the tire and the journal to increase the impedance to compressive waves passing from the tire to the journal.

References Cited in the file of this patent

UNITED STATES PATENTS

| | | | |
|---|---|---|---|
| 52,986 | Fryer et al. | Mar. 6, 1886 |
| 1,265,811 | Ohlson | May 14, 1918 |
| 1,524,555 | Kempton | Jan. 27, 1925 |
| 1,648,413 | Maas | Nov. 8, 1927 |
| 2,380,776 | Miller | July 31, 1945 |
| 2,548,839 | Coombes | Apr. 10, 1951 |
| 2,756,607 | Mochel et al. | July 31, 1956 |

FOREIGN PATENTS

| | | |
|---|---|---|
| 564,514 | Germany | Nov. 19, 1932 |
| 859,702 | Germany | Dec. 15, 1952 |